(12) United States Patent
Vleugels et al.

(10) Patent No.: US 12,285,027 B2
(45) Date of Patent: Apr. 29, 2025

(54) CONFECTIONERY PRODUCT AND MANUFACTURING PROCESS THEREOF

(71) Applicant: PERFETTI VAN MELLE S.P.A., LAINATE (IT)

(72) Inventors: Tanja Catharina Jozefina Vleugels, Tm Breda (NL); Petrus Henricus De Jong, Bd Breda (NL); Alessandro Bottini, Lainate (IT)

(73) Assignee: PERFETTI VAN MELLE S.P.A., Lainate (IT)

( * ) Notice: Subject to any disclaimer, the term of this patent is extended or adjusted under 35 U.S.C. 154(b) by 360 days.

(21) Appl. No.: 17/785,336

(22) PCT Filed: Dec. 14, 2020

(86) PCT No.: PCT/EP2020/085999
§ 371 (c)(1),
(2) Date: Jun. 14, 2022

(87) PCT Pub. No.: WO2021/122463
PCT Pub. Date: Jun. 24, 2021

(65) Prior Publication Data
US 2023/0036873 A1    Feb. 2, 2023

(30) Foreign Application Priority Data
Dec. 16, 2019   (IT) .................. 102019000024027

(51) Int. Cl.
A23G 3/54    (2006.01)
A23G 3/34    (2006.01)
A23G 3/42    (2006.01)

(52) U.S. Cl.
CPC ............ *A23G 3/54* (2013.01); *A23G 3/0065* (2013.01); *A23G 3/42* (2013.01); *A23V 2002/00* (2013.01)

(58) Field of Classification Search
CPC .......... A23G 3/54; A23G 3/0065; A23G 3/42; A23V 2002/00
USPC ....................................................... 426/103
See application file for complete search history.

(56) References Cited

U.S. PATENT DOCUMENTS

| 4,326,052 A | 4/1982 | Kang et al. |
| 4,385,123 A | 5/1983 | Kang et al. |
| 5,158,800 A | 10/1992 | Bell |

FOREIGN PATENT DOCUMENTS

| EP | 1 023 841 | 8/2000 |
| EP | 1 104 652 | 6/2001 |
| EP | 2 117 336 | 8/2017 |
| JP | H05192098 A | 8/1993 |
| WO | 00/06127 | 2/2000 |
| WO | 02/30214 | 4/2002 |
| WO | 2006/083784 | 8/2006 |
| WO | 2008/091476 | 7/2008 |
| WO | 2011/153229 | 12/2011 |
| WO | 2018127474 A1 | 7/2018 |
| WO | 2019/055626 | 3/2019 |

OTHER PUBLICATIONS

Commission Regulation (EU) No. 1129/2011 of Nov. 11, 2011, 212 pp.
Office Action, issued in Japanese Patent Application No. 2022-536535 dated Dec. 3, 2024.

*Primary Examiner* — Subbalakshmi Prakash
(74) *Attorney, Agent, or Firm* — NIXON & VANDERHYE

(57) ABSTRACT

Disclosed is a confectionery product including a chewy center, free of gelatine and other hydrocolloids different from gellan gum, including gellan gum, a layer of at least partially amorphous candy material surrounding the chewy center and optionally one or more additional coating layers surrounding the at least partially amorphous candy material layer. The process for manufacturing the confectionery product is also disclosed.

18 Claims, No Drawings

CONFECTIONERY PRODUCT AND MANUFACTURING PROCESS THEREOF

This application is the U.S. national phase of International Application No. PCT/EP2020/085999 filed Dec. 14, 2020, which designated the U.S. and claims priority to IT 102019000024027 filed Dec. 16, 2019, the entire contents of each of which are hereby incorporated by reference.

FIELD OF THE INVENTION

The invention relates to coated gelatine-free confectionery products having a chewy center containing gellan gum, and to a method for producing them.

BACKGROUND OF THE INVENTION

Chewy candies with a chewy center with a hard candy shell are known in the art.

WO 2006/083784 and WO 2008/091476 disclose multilayer confectionary product having a chewy center including an ingestible dextrin, optionally gum arabic, a sweetener, water and flavour, an intermediate layer including a flavour and a sweetener which is at least partially crystalline and an outer shell which is a crunchy hard shell. The sweeteners may be sucrose and corn syrup.

Hydrocolloids are commonly used as gelling agent in a sugar/glucose syrup system.

One of the most common hydrocolloids used in sugar confectionery is gelatine used primarily as a gelling agent. Gelatine imparts to the chewy sugar confectionery an unique viscoelastic texture (referred to as e.g. springiness and resilience) especially desirable to consumers. The presence of gelatine improve the manufacturing process, providing a desirable viscosity to the semi-finished confectionery material, making easier to pump, extrude or convey the material along the different stages of the production. Moreover, gelatine has an emulsifying power which allows to homogenize fat with sugar, glucose syrup and residual moisture of chewy candies. However, gelatine is of animal origin.

Due to ethical, religious, dietary restrictions or a vegetarian diet, there is an increasing demand of products that are free from ingredients derived from animal sources. Thus, alternatives to gelatine have been sought to produce gelatine-free confectionary products with a gelatine-like texture.

Gum arabic, reported in WO2006/083784, is a thickening and gelling agent of vegetable origin used in chewy confectionery and can be an alternative to gelatine, however the geographical origin of gum arabic, which is produced in some African countries, makes the supply extremely variable year after year. Thus, it is also desirable to find alternatives to gum arabic as well as to gelatine.

WO2011/153229 discloses a dough-like confectionary material employed as layering or coating material which contain 70-98% of solid particulates of sugar, sugar alcohol or mixtures thereof and 0.1-20% of a diffusion controller which may be, among the others, gelatine or gellan. The diffusion controller used in the examples is xanthan gum.

WO02/30214 discloses gelatine-free gummy confections comprising gellan gum and a carrageenan. Carrageenan is added to the gelatine-free confectionery product because the gellan products "lack the gelatine-like texture due to their relatively low springiness and resiliency".

The products containing gellan gum present processing difficulties such as the collapse of the chewy center after forming due to viscosity, which is lower than the one characterizing the products made with gelatine and a reduction of water migration due to the hygroscopicity of gellan gum which reduces the water migration from the chewy center to the surrounding candy layer.

It has now been found that a chewy center based on sugar/glucose syrup wherein gelatine has been replaced by gellan gum preferably without the presence of gum arabic and other hydrocolloids has the desired properties of viscosity when the ratio sugar/glucose syrup is maintained in a specific range.

The multilayer confectionary products of the invention have, during processing, a chewy center coated by a surrounding at least partially amorphous candy layer with enough viscosity to be formed and optionally coated without collapsing.

Furthermore, a specific ratio sugar/glucose syrup in the surrounding at least partially amorphous candy layer was surprisingly found to allow the surrounding candy layer to at least partially crystallize and to have the desired texture when the product reaches the consumer.

DETAILED DESCRIPTION OF THE INVENTION

Object of the present invention is a confectionery product including a chewy center comprising sugar, glucose syrup and gellan gum, a layer of at least partially amorphous candy material surrounding said chewy center, wherein the ratio sugar/glucose syrup in the chewy center ranges from 54:46 to 49:51 on dry weight basis characterized in that the chewy center is free of gelatin and other hydrocolloids different from gellan gum.

The chewy center and the candy layer do not comprise gelatine and preferably do not comprise gum arabic or other hydrocolloids different from gellan gum.

The expression "other hydrocolloids different from gellan gum" means' in particular, hydrocolloids such as, for example, gum arabic, xanthan gum, agarose, pectin, starch, carrageenan, locust bean gum and their derivatives.

In other words, the chewable center contains gellan gum as the only hydrocolloid.

Preferably the layer of candy material does not comprise gelatin, gellan gum and other hydrocolloids such as for example those defined above.

Preferably the confectionery material has at least one additional coating layer surrounding the candy layer.

The preferred ratio sugar/glucose syrup in the chewy layer 50:50 to 53:47 on dry weight basis.

Gellan gum useful herein is or is derived from native gellan gum also referred as high acyl gellan.

Native gellan gum is a polymer produced by inoculating a carefully formulated fermentation medium with the microorganism Sphingamonas elodea (ATIC 31461). Methods disclosed e.g. in U.S. Pat. Nos. 4,326,052 and 4,385,123. The outcome of the fermentation is a polysaccharide with a straight chain made of three monomers: glucose, rhamnose and glucuronic acid. The hydroxyl groups at C2 and C6 of glucose units can be esterified with acetyl and glyceryl groups. The native gellan polymer can be deacetylated to various extents.

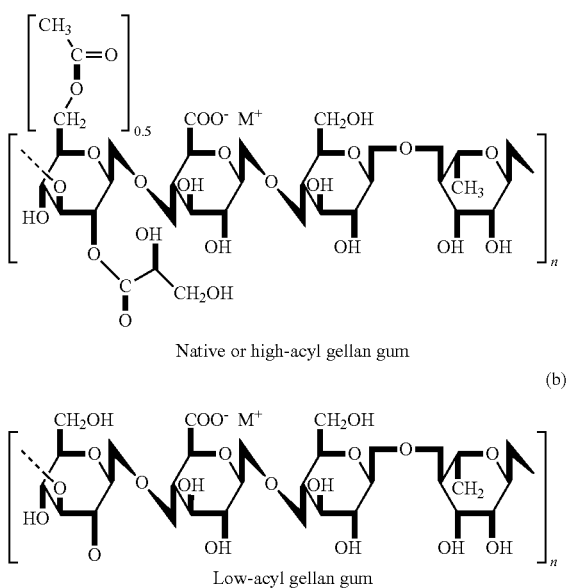

Native or high-acyl gellan gum

Low-acyl gellan gum

Gellan gum useful herein includes native gellan gum and any form derived therefrom and available, such as, but not limited to: non-clarified, clarified, and partially clarified native, deacetylated and partially deacetylated forms as well as mixtures thereof and the like.

Gellan gum is available from CP Kelco Company, 1313 North Market Street, Wilmington, Delaware 19894, USA. Typical brand names include KELCOGEL and GELRITE. KELCOGEL and GELRITE are trademarks of CP Kelco Company.

Particularly preferred is KELCOGEL F.

The amount of gellan gum in the chewy center preferably ranges from 0.02% to 1% by weight compared to the total weight of the chewy center, most preferably from 0.03% to 0.07% by weight compared to the total weight of the chewy center.

Preferably. the moisture content in the chewy center ranges from 6% to 10% by weight, most preferably from 6.8% to 8% by weight, compared to the total weight of the chewy center.

The chewy center may further contain flavours, fats, emulsifiers, colours, acids and authorized food additives in general as reported for example in Reg.1129/2011 of the European Union or in the Codex Alimentarius.

In one embodiment the fat is present from 1% to 12% by weight of the chewy candy material, preferably from 3% to 10% by weight of the chewy candy material, even more preferably from 5% to 8% by weight of the chewy candy material.

The surrounding candy layer of at least partially amorphous candy material comprises sugar and glucose syrup.

The ratio sugar/glucose syrup in the surrounding at least partially amorphous candy layer preferably ranges from 55:45 to 48:52 on dry weight basis, more preferably from 54:46 to 49:51 on dry weight basis and even more preferably from 53:47 to 50:50 on dry weight basis.

The moisture content in the in the surrounding at least partially amorphous candy layer preferably ranges from 4% to 8% and more preferably from 4.5% to 5.8% by weight, compared to the weight of the surrounding at least partially amorphous candy layer.

The surrounding at least partially amorphous candy layer may further contain flavour, fats, emulsifiers, colours, acids and authorized food additives in general as reported for example in Reg.1129/2011 of the European Union or in the Codex Alimentarius.

The sugar used in the chewy material and in the surrounding at least partially amorphous candy layer is preferably selected from refined sugar with ICUMSA grade <50, preferably ≤30.

The glucose syrup used in the chewy material and in the surrounding at least partially amorphous candy layer is preferably characterized by a content of mono and disaccharides ranging from 25% to 35% by weight, most preferably from 28% to 34% by weight, on dry weight basis.

Glucose syrup preferably contains at least 19% by weight, most preferably from 20% to 28% by weight, of oligosaccharides having a DP index (degree of polymerization) greater than 9, compared to the total weight of glucose syrup on dry weight basis.

Alternatively, the glucose syrup is high maltose glucose syrup, preferably containing total mono and disaccharides from 40% to 70%. The high maltose syrup preferably employed in the invention contains >50% total mono and disaccharides.

The coating layer may be a hard or soft coating or a combination of hard and soft coating.

The coating layer may have known composition and can be manufactured according to known methods as reported in E. B. Jackson, Sugar confectionery manufacture, 2nd Edition, Aspen Publishers Inc, Geithersburg, Maryland (1999) or J. A. Merl and K. W. Stock, Silesia Confiserie Manual No 4, Silesia Gerhard Hanke KG, Abt. Fachbucherei, Neuss-Germany (1996).

Preferably the coating layer contains sugar, glucose, flavors, natural or artificial colours, thickeners (referred also as binding agents, e.g. starch), quick coat, fats, emulsifiers and additives in general. Preferably the coating does not contain titanium dioxide.

The confectionary products of the invention may be produced by a method comprising the steps of:

a) providing a gelatine free chewy candy confectionery material comprising sugar, glucose syrup and gellan gum wherein the ratio sugar/glucose syrup ranges from 54:46 to 49:51 on dry weight basis characterized in that the chewy center is free of gelatin and other hydrocolloids different from gellan gum;
b) providing a candy confectionery material comprising at least partially amorphous sugar and glucose syrup;
c) combining the chewy confectionery material and the candy material so that the candy material surrounds a core of confectionery material;
d) allowing the amorphous sugar of the candy material to at least partially crystallize.

The chewy candy confectionery material provided at the phase a) can be prepared by sugar, glucose syrup and water which are combined in the preferred ratios and cooked under vacuum to the preferred water content. Gellan gum can be added as a solution after cooking. In a preferred embodiment a gellan solution is added to the sugar, glucose syrup and water mix before cooking. It has been surprisingly found that when gellan gum replaces gelatine, the vacuum cooked mass generates less foam. This translates in higher efficiency, allowing the cooker to work continuously more than 72 h and even more than 100 h vs 24 h of continuous operation with gelatine containing formula.

Emulsifiers and fats are added before or after cooking. Preferably the chewy mass is lecithin free and sucrose esters of fatty acids are preferred emulsifiers. It has been surprisingly found that sucrose esters of fatty acids speed up the sugar crystal formation in the chewy mass, reducing the time needed for pulling.

The cooked mass is preferably pulled, inseminated with powdered sugar or previously crystallized chewy mass. Flavours, colours, acids are added in the pulling machines or in in line mixers or at the moment of the extrusion. The chewy mass completed with previously mentioned ingredients is combined with the hard candy mass.

The mass of candy confectionery material is prepared by mixing sugar, glucose syrup and water and cooked under vacuum according to known methods to the target residual moisture.

After cooking the candy mass is added with flavours, colours and other additives. In a preferred embodiment, the boiled mass of candy confectionery material is added with powdered sugar.

Both the candy confectionery material and the chewy candy material are cooled and transported to a combining unit, like an extrusion machine or a batch roller machine, or any suitable means known to the technician used to prepare a rope of concentrically combined materials, wherein the inner part is made by the chewy confectionery material comprising at least partially crystallized sugar and the outer part, surrounding said chewy confectionery material, is made by hard candy confectionery material comprising at least partly amorphous sugar.

In one preferred embodiment, at this stage the chewy candy confectionery material comprises sugar in crystalline state for more than 80%, preferably more than 90%, or even more than 95% over the total sugar of the chewy candy material.

At the same time the hard candy confectionery material comprises sugar in amorphous form from 80% to 99.9% of the sugar present in the hard candy confectionery material, preferably from 95% to 99.5% of the sugar present in the hard candy confectionery material.

The rope of combined confectionery material is reduced to the desired diameter in a rope sizer comprising at least two couples sizing wheels, preferably at least four couples of sizing wheels, and then reduced to singles pieces by any suitable means, comprising die forming, stamping, cutting, ball forming.

The single pieces of combined candy material are cooled in cooling tunnel.

The resulting candies have an outer hard layer of at least partially amorphous candy and an inner core of chewy material and can be then packed and sold after a suitable time to allow the amorphous sugar to crystallize.

Alternatively the candies can be polished, dusted or coated in a coating pan.

Any type of coating is possible, comprised chocolate coating, compound coating, hard coating, soft coating, sanding, dusting and silvering.

One or more coatings can be combined together and a final polishing layer can be included to add shine and lustre to the candies.

In a preferred embodiment coating operations are started from a few minutes to 24 h after candy forming.

The coated candies are packed and sold after a suitable time to allow the amorphous sugar to crystallize. In a preferred embodiment the amorphous sugar of the candy material is induced to at least partially crystallized in controlled conditions.

It has been surprisingly found that controlling the conditions as reported above allows the crystallization of the amorphous sugar originally present in the hard candy confectionery material of ≥80%, preferably ≥90% in percentage of the sugar present in the originally hard candy material.

Examples 1-5: Preparation of the Chewy Material for the Manufacture of the Chewy Center The ingredients were weighed and combined according to the method reported in Example 1 of EP2117336B1.

The compositions of the chewy centers and the evaluation of the obtained product are reported in the following Tables 1-5.

Example 1 (Comparative—Arabic Gum Based Recipe, Gelatine Free, According to EP2117336B1—Example 2)

TABLE 1

| Ingredient | Solids % | Wet weight % | Dry weight (Kg) | Final chewy material weight % | Sugar/Glucose ratio (dry basis) |
|---|---|---|---|---|---|
| Sugar | 100 | 33 | 33 | 37.35 | 55 |
| Glucose Syrup | 80 | 33 | 27.06 | 30.63 | 45 |
| Water | 0 | 11 | 0 | | |
| Nutriose | 100 | 6 | 6 | 6.79 | |
| Water | 0 | 2 | 0 | | |
| Gum Arabic | 100 | 2 | 2 | 2.26 | |
| Gelatine | 100 | | | | |
| Gellan gum | 100 | | | | |
| Fat-Hydrogenated Palm Kernel Oil | 100 | 8 | 8 | 9.06 | |
| Fat-Fractionated oil | 100 | | | | |
| Glyceride | 100 | 0.2 | 0.2 | 0.23 | |
| Lecithin | 100 | 0.2 | 0.2 | 0.23 | |
| Sucrose esters | 100 | | | | |
| Powder Sugar | 100 | 5 | 5 | 5.66 | |
| Rework | 93 | | | | |
| Flavor | 100 | 0.7 | 0.7 | 0.79 | |
| Residual water | | | | 7.00 | |
| Total | | 101.1 | 82.16 | 100.00 | |

Evaluation: The obtained chewy material is a consistent dough, fully grained, with some fat sweating and some gum arabic flavor.

Example 2 (Comparative—Gelatine Based Recipe)

TABLE 2

| Ingredient | Solids % | Wet weight (Kg) | Dry weight (kg) | Final chewy material weight % | Sugar/Glucose ratio (dry basis) |
|---|---|---|---|---|---|
| Sugar | 100 | 10.6 | 10.6 | 48.02 | 55 |
| Residual water | | | | | |
| Glucose Syrup | 80 | 10.6 | 8.7 | 39.38 | 45 |
| Water | 0 | 2.8 | | | |
| Nutriose | 100 | | | | |
| Water | 0 | 1 | | | |
| Gum Arabic | 100 | | | | |
| Gelatine | 100 | 0.01 | 0.01 | 0.05 | |
| Gellan gum | 100 | | | | |
| Fat-Hydrogenated Palm Kernel Oil | 100 | 1 | 1 | 4.53 | |
| Fat-Fractionated oil | 100 | | | | |
| Glyceride | 100 | | | | |

TABLE 2-continued

| Ingredient | Solids % | Wet weight (Kg) | Dry weight (kg) | Final chewy material weight % | Sugar/Glucose ratio (dry basis) |
|---|---|---|---|---|---|
| Lecithin | 100 | 0.01 | 0.01 | 0.05 | |
| Sucrose esters | 100 | | | | |
| Powder Sugar | 93 | 0.2 | 0.186 | 0.84 | |
| Rework | 100 | 0.03 | 0.03 | 0.14 | |
| Flavor | | | | 7.00 | |
| Total | | 26.25 | 20.51 | 100.00 | |

Evaluation:
The obtained chewy material is a consistent dough, fully grained. It can be easily transported and joined to the candy material

Example 3 (Gellan Gum Based Recipe—Preferred Range of Sugar/Glucose Ratio)

TABLE 3

| Ingredient | solids % | Wet weight (Kg) | Dry weight (kg) | Final chewy material % | Sugar/Glucose ratio (dry basis) |
|---|---|---|---|---|---|
| Sugar | 100 | 12.00 | 12.00 | 43.53 | 50 |
| Glucose Syrup | 82 | 14.50 | 11.89 | 43.13 | 50 |
| Water | 0 | 5.00 | | | |
| Nutriose | 100 | | | | |
| Water | 0 | | | | |
| Gum Arabic | 100 | | | | |
| Gelatine | 100 | | | | |
| Gellan gum | 100 | 0.01 | 0.01 | 0.05 | |
| Fat-Hydrogenated Palm Kernel Oil | 100 | | | | |
| Fat-Fractionated oil | 100 | 1.65 | 1.65 | 5.99 | |
| Glyceride | 100 | | | | |
| Lecithin | 100 | | | | |
| Sucrose esters | 100 | 0.01 | 0.01 | 0.05 | |
| Powder Sugar | 100 | | | | |
| Rework | 93 | | | | |
| Flavor | 100 | 0.07 | 0.07 | 0.25 | |
| Residual water | | | | 7 | |
| Total | | 33.248 | 25.6 | 100.0 | |

Example 4 (Gellan Gum Based Recipe—Borderline Value of the Range of Sugar/Glucose Ratio)

TABLE 4

| Ingredient | solids % | Wet Weight (Kg) | Dry weight (kg) | Final chewy material % | Sugar/Glucose ratio (dry basis) |
|---|---|---|---|---|---|
| Sugar | 100 | 13.00 | 13.00 | 46.83 | 54 |
| Glucose Syrup | 82 | 13.50 | 11.07 | 39.88 | 46 |
| Water | 0 | 5.00 | | | |
| Nutriose | 100 | | | | |
| Water | 0 | | | | |
| Gum Arabic | 100 | | | | |
| Gelatine | 100 | | | | |
| Gellan gum | 100 | 0.01 | 0.01 | 0.05 | |
| Fat-Hydrogenated Palm Kernel Oil | 100 | | | | |
| Fat-Fractionated oil | 100 | 1.65 | 1.65 | 5.94 | |
| Glyceride | 100 | | | | |
| Lecithin | 100 | | | | |

TABLE 4-continued

| Ingredient | solids % | Wet Weight (Kg) | Dry weight (kg) | Final chewy material % | Sugar/Glucose ratio (dry basis) |
|---|---|---|---|---|---|
| Sucrose esters | 100 | 0.01 | 0.01 | 0.05 | |
| Powder Sugar | 100 | | | | |
| Rework | 93 | | | | |
| Flavor | 100 | 0.07 | 0.07 | 0.25 | |
| Residual water | | | | 7 | |
| Total | | 33.248 | 25.8 | 100.0 | |

Evaluation: The obtained chewy material is a soft acceptable dough (somewhat softer than the chewy material of Example 1 and Example 2), fully crystallized. It can be transported but the transport parameters need to be adjusted (time-cooling)

Example 5 (Gellan Gum Based Recipe—Borderline Value of the Range of Sugar/Glucose Ratio)

TABLE 5

| Ingredient | solids % | Wet weight (Kg) | Dry weight (kg) | Final chewy material % | Sugar/Glucose ratio (dry basis) |
|---|---|---|---|---|---|
| Sugar | 100 | 11.50 | 11.50 | 41.86 | 48 |
| Glucose Syrup | 82 | 15.00 | 12.30 | 44.77 | 52 |
| Water | 0 | 5.00 | | | |
| Nutriose | 100 | | | | |
| Water | 0 | | | | |
| Gum Arabic | 100 | | | | |
| Gelatine | 100 | | | | |
| Gellan gum | 100 | 0.01 | 0.01 | 0.05 | |
| Fat-Hydrogenated Palm Kernel Oil | 100 | | | | |
| Fat-Fractionated oil | 100 | 1.65 | 1.65 | 6.01 | |
| Glyceride | 100 | | | | |
| Lecithin | 100 | | | | |
| Sucrose esters | 100 | 0.01 | 0.01 | 0.05 | |
| Powder Sugar | 100 | | | | |
| Rework | 93 | | | | |
| Flavor | 100 | 0.07 | 0.07 | 0.25 | |
| Residual water | | | | 7 | |
| Total | | 33.248 | 25.5 | 100.0 | |

Evaluation:
The obtained chewy material is an acceptable tough dough (somewhat harder with the chewy material of Example 1 and Example 2), fully crystallized. It can be transported but the transport parameters need to be adjusted (time-cooling)

Examples 6-10: Candy Material for the Manufacture of the Candy Layer

Candy material is prepared according to the method of Example 1 of EP2117336B1, weighing the ingredients except powder sugar and boiling under vacuum till reaching the desired residual water. The obtained liquid mass is combined after cooking with the powder sugar and cooled to a plastic pliable mass.

The compositions of the candy layer and the evaluation of the obtained product are reported in the following Tables 6-10.

Example 6 (Comparative According to EP2117336B1—Example 2)

TABLE 6

| Ingredient | Solids % | Wet weight (Kg) | Dry weight (Kg) | Final candy material % | Sugar/Glucose ratio (dry basis) |
|---|---|---|---|---|---|
| Sugar | 100 | 57 | 57 | 66.25 | 70 |
| Glucose Syrup | 82 | 30 | 24.6 | 28.59 | 30 |
| Water | 0 | 12 | | | |
| Powder Sugar | 100 | | | | |
| Flavor | 100 | 1 | 1 | 1.16 | |
| Residual water | | | | 4.00 | |
| Total | | 100 | 82.6 | 100.00 | |

Evaluation: The obtained candy material is a consistent dough, fully glassy, with poor plasticity and some tendency to break even when warm.

Example 7 (Borderline Value of Preferred Range of Sugar/Glucose Ratio)

TABLE 7

| Ingredient | Solids % | Wet weight (Kg) | Dry weight (kg) | Final candy material % | Sugar/Glucose ratio (dry) |
|---|---|---|---|---|---|
| Sugar | 100 | 49 | 49.00 | 50.67 | 54 |
| Glucose Syrup | 82 | 51 | 41.82 | 43.24 | 46 |
| Water | 0 | | | | |
| Powder Sugar | 100 | 1.88 | 1.88 | 1.94 | |
| Flavor | 100 | 0.14 | 0.14 | 0.14 | |
| Residual water | | | | 4.00 | |
| Total | | 102.02 | 92.84 | 100.00 | |

Evaluation:
The obtained candy material is a consistent dough, fully amorphous except for the powder sugar part.

Example 8 (Preferred Range of Sugar/Glucose Ratio)

TABLE 8

| Ingredient | Solids % | Wet weight (Kg) | Dry weight (kg) | Final candy material % | Sugar/Glucose ratio (dry) |
|---|---|---|---|---|---|
| Sugar | 100 | 10.69 | 10.69 | 48.96 | 52 |
| Glucose Syrup | 82 | 11.96 | 9.81 | 44.92 | 48 |
| Water | 0 | 3.23 | | 0.00 | |
| Powder Sugar | 100 | 0.43 | 0.43 | 1.97 | |
| Flavor | 100 | 0.03 | 0.03 | 0.15 | |
| Residual water | | | | 4 | |
| Total | | 26.34 | 20.96 | 100.00 | |

Evaluation: The obtained candy material is a consistent dough, fully amorphous except for the powder sugar part.

Example 9 (Borderline Value of Preferred Range of Sugar/Glucose Ratio)

TABLE 9

| Ingredient | Solids % | Wet weight (Kg) | Dry weight (kg) | Final candy material % | Sugar/Glucose ratio (dry) |
|---|---|---|---|---|---|
| Sugar | 100 | 10.95 | 10.95 | 50.24 | 54 |
| Glucose Syrup | 82 | 11.60 | 9.51 | 43.64 | 46 |
| Water | 0 | 3.23 | | | |
| Powder Sugar | 100 | 0.43 | 0.43 | 1.97 | |
| Flavor | 100 | 0.03 | 0.03 | 0.15 | |
| Residual water | | | | 4 | |
| Total | | 26.24 | 20.92 | 100.00 | |

Evaluation:

The obtained candy material is a consistent dough, fully amorphous except for the powder sugar part Example 10 (Borderline Value of Preferred Range of Sugar/Glucose Ratio)

TABLE 10

| Ingredient | Solids % | Wet weight (Kg) | Dry weight (kg) | Final candy material % | Sugar/Glucose ratio (dry) |
|---|---|---|---|---|---|
| Sugar | 100 | 9.80 | 9.80 | 44.97 | 48 |
| Glucose Syrup | 82 | 13.00 | 10.66 | 48.91 | 52 |
| Water | 0 | 3.23 | | | |
| Powder Sugar | 100 | 0.43 | 0.43 | 1.97 | |
| Flavor | 100 | 0.03 | 0.03 | 0.15 | |
| Residual water | | | | 4 | |
| Total | | 26.49 | 20.92 | 100.00 | |

Evaluation:
The obtained candy material, is a consistent dough, fully amorphous except for the powder sugar part Examples 11-15: Preparation of Candies with a Chewy Layer and a Candy Layer The chewy material and the candy material obtained in the previous examples were combined and formed according to known methods to form centers with two concentric layers, an inner core of chewy material surrounded by a layer of candy material. Suitable methods are reported in WO00/06127. The percentages of the chewy material and candy material are reported in the following Table 11. While the candy material is still amorphous the centers are coated with a sugar based hard coating according to known methods. The candies were kept in controlled conditions for 14 days and then evaluated organoleptically by a panel of trained judges, reporting the overall comment registered after each example.

TABLE 11

| Material | Sugar/Glucose ratio (dry basis) | Ex. 11 (comparative) % | Ex. 12 (comparative) % | Ex. 13 % | Ex. 14 % | Ex. 15 % |
| --- | --- | --- | --- | --- | --- | --- |
| Chewy material-Ex.1 (comparative-EP21173336B1) | 55/45 | 60 | | | | |
| Chewy material-Ex.2 (comparative-gelatine based recipe) | 54/46 | | 40 | | | |
| Chewy material-Ex.3 (preferred range of sugar/glucose ratio) | 50/50 | | | 40 | | |
| Chewy material-Ex.4 (borderline value of sugar/glucose ratio) | 54/46 | | | | 40 | |
| Chewy material-Ex. 5 (borderline value of sugar/glucose ratio) | 48/52 | | | | | 40 |
| Candy material-Ex. 6 (comparative-EP21173336B1) | 70/30 | 40 | | | | |
| Candy material-Ex. 7 (borderline value of preferred sugar/glucose ratio) | 54/46 | | 60 | | | |
| Candy material-Ex.8 (preferred range of sugar/glucose ratio) | 52/48 | | | 60 | | |
| Candy material-Ex.9 (borderline value of preferred sugar/glucose ratio) | 54/46 | | | | 60 | |
| Candy material-Ex. 10 (borderline value of preferred sugar/glucose ratio) | 48/52 | | | | | 60 |
| Total | | 100 | 100 | 100 | 100 | 100 |
| Hard coating | Overweight % Evaluation | 30 | 30 | 30 | 30 | 30 |
| Average crack (1-10) | | 7 | 8 | 8 | 9 | 8 |
| Average softness first bite (1-10) | | 5 | 7 | 7 | 8 | 5 |
| Average chew experience (1-10) | | 6 | 8 | 8 | 6 | 6 |

Overall Evaluation:

Example 11 (Comparative)

Candies with acceptable quality, some portion of the candy material is soft as reported in EP2117336B1.

Example 12 (Comparative)

Candies with very good quality, better than 11, all the candy material is soft and crystallized. Chewiness is consistent without breaking of the center in pieces. Good crack of the coating part.

Example 13

Candies with very good quality, non-distinguishable from those of Ex. 12, better than those of Ex. 11, all the candy material is soft and crystallized. Chewiness is consistent without breaking of the center in pieces. Good crack of the coating part.

Example 14

Candies with acceptable quality, the candy material is soft and crystallized. Chewiness tend to be too plastic with reduced elasticity and changes from candy to candy, a residual part of the candies start to have too much or too little filling, some deshaping during coating. Very good crack of the coating part.

Example 15

Candies with acceptable quality, some portion of the candy material is soft similarly to EP2117336. Chewiness tend to be difficult to evaluate because in a residual part of the pieces the hard candy part being in part soft and in part hard. Good crack of the coating part.

The invention claimed is:

1. A confectionery product including a chewy center comprising sugar, glucose syrup and gellan gum, a layer of at least partially amorphous candy material surrounding said chewy center, wherein the ratio sugar/glucose syrup in the chewy center ranges from 54:46 to 49:51 on dry weight basis wherein the chewy center is free of gelatin and other hydrocolloids different from gellan gum;

wherein the glucose syrup used in the chewy material and/or in the at least partially amorphous candy layer comprises mono and disaccharides ranging from 25% to 35% by weight, on dry weight basis; and wherein the glucose syrup contains at least 19% by weight of sugars having a DP index greater than 9, compared to the total weight of glucose syrup on dry weight basis.

2. The confectionary product according to claim 1, wherein the ratio sugar/glucose syrup in the chewy layer is 50:50 to 53:47 on dry weight basis.

3. The confectionary product according to claim 1, wherein the amount of gellan gum in the chewy center ranges from 0.02% to 1% by weight compared to the total weight of the chewy center.

4. The confectionary product according to claim 1, wherein the moisture content in the chewy center ranges from 6% to 10% by weight compared to the total weight of the chewy center.

5. The confectionary product according to claim 1, wherein the layer of said at least partially amorphous candy material comprises sugar and glucose syrup.

6. The confectionary product according to claim 5, wherein the ratio sugar/glucose syrup in the layer of said at least partially amorphous candy material ranges from 55:45 to 48:52 on dry weight basis.

7. The confectionary product according to claim 1, wherein the moisture content in the in the at least partially amorphous candy layer ranges from 4% to 8% by weight compared to the total weight of the at least partially amorphous candy layer.

8. The confectionary product according to claim 1, wherein the glucose syrup is high maltose glucose syrup.

9. The confectionery product according to claim 1, further comprising at least one coating layer.

10. The confectionary product according to claim 1, wherein at least one coating layer is a hard or soft coating or a combination of hard and soft coating.

11. A method for manufacturing the confectionary product as defined in claim 1, comprising the steps of:
  a) providing a chewy candy confectionery material comprising sugar, glucose syrup and gellan gum wherein the ratio sugar/glucose syrup ranges from 54:46 to 49:51 on dry weight basis, wherein the chewy center is free of gelatin and other hydrocolloids different from gellan gum;
  b) providing a candy material comprising at least partly amorphous sugar and glucose syrup wherein the ratio sugar/glucose syrup ranges from 55:45 to 48:52;
  c) combining the chewy confectionery material and the candy material so that the candy material surrounds a core of chewy confectionery material;
  d) allowing the amorphous sugar of the candy material to at least partially crystallize;
  wherein the glucose syrup used in the chewy material and/or in the at least partially amorphous candy layer comprises mono and disaccharides ranging from 25% to 35% by weight, on dry weight basis; and
  wherein the glucose syrup contains at least 19% by weight of sugars having a DP index greater than 9, compared to the total weight of glucose syrup on dry weight basis.

12. The confectionery product according to claim 2, wherein the amount of gellan gum in the chewy center ranges from 0.02% to 1% by weight compared to the total weight of the chewy center.

13. The confectionary product according to claim 2, wherein the moisture content in the chewy center ranges from 6% to 10% by weight compared to the total weight of the chewy center.

14. The confectionary product according to claim 3, wherein the moisture content in the chewy center ranges from 6% to 10% by weight compared to the total weight of the chewy center.

15. The confectionary product according to claim 2, wherein the layer of said at least partially amorphous candy material comprises sugar and glucose syrup.

16. The confectionary product according to claim 3, wherein the layer of said at least partially amorphous candy material comprises sugar and glucose syrup.

17. The confectionary product according to claim 4, wherein the layer of said at least partially amorphous candy material comprises sugar and glucose syrup.

18. The confectionary product according to claim 2, wherein the moisture content in the in the at least partially amorphous candy layer ranges from 4% to 8% by weight compared to the total weight of the at least partially amorphous candy layer.

* * * * *